United States Patent
Buruganahalli (10) Patent No.: US 10,079,838 B2
(45) Date of Patent: Sep. 18, 2018

(54) DECRYPTION OF DATA BETWEEN A CLIENT AND A SERVER

(71) Applicant: McAfee, LLC., Santa Clara, CA (US)

(72) Inventor: Shivakumar Buruganahalli, San Jose, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 13/977,423

(22) PCT Filed: Mar. 14, 2013

(86) PCT No.: PCT/US2013/031555
§ 371 (c)(1),
(2) Date: Jun. 28, 2013

(87) PCT Pub. No.: WO2014/142901
PCT Pub. Date: Sep. 18, 2014

(65) Prior Publication Data
US 2014/0281510 A1 Sep. 18, 2014

(51) Int. Cl.
H04L 29/06 (2006.01)

(52) U.S. Cl.
CPC ........ H04L 63/1408 (2013.01); H04L 63/045 (2013.01); H04L 63/0435 (2013.01)

(58) Field of Classification Search
CPC ...................................................... G06F 21/56
See application file for complete search history.

(56) References Cited

U.S. PATENT DOCUMENTS

| | | | |
|---|---|---|---|
| 2002/0076042 A1* | 6/2002 | Sandhu | H04L 9/30 380/30 |
| 2003/0204720 A1* | 10/2003 | Schoen | H04L 12/581 713/153 |
| 2006/0195589 A1* | 8/2006 | Vaitl | 709/227 |
| 2008/0137591 A1* | 6/2008 | Hirano et al. | 370/328 |
| 2011/0066857 A1 | 3/2011 | Probst et al. | |
| 2011/0085667 A1 | 4/2011 | Berrios et al. | |
| 2011/0231650 A1 | 9/2011 | Coulier | |
| 2011/0289310 A1* | 11/2011 | Selgas | H04L 9/0894 713/150 |
| 2012/0174196 A1* | 7/2012 | Bhogavilli et al. | 726/5 |
| 2013/0042324 A1 | 2/2013 | Bennett | |

FOREIGN PATENT DOCUMENTS

WO  WO 2012056370  5/2012  ............ G06F 21/24

OTHER PUBLICATIONS

International Search Report and Written Opinion; PCT/US2013/031555; pp. 12, dated Dec. 13, 2013.

* cited by examiner

*Primary Examiner* — Catherine Thiaw
*Assistant Examiner* — Arya Golriz
(74) *Attorney, Agent, or Firm* — Byrne Poh LLP (57) ABSTRACT

Technologies for securing communication may include monitoring a secured network connection between a client and a server. The secured network connection may be secured using a symmetric cryptographic key. The technologies may also include detecting a transmission of secured information between the client and the server, copying the transmission, forwarding the transmission to an intended recipient, decrypting the transmission using the symmetric cryptographic key, and determining whether the transmission is indicative of malware.

19 Claims, 6 Drawing Sheets

DECRYPTION OF DATA BETWEEN A CLIENT AND A SERVER

RELATED APPLICATIONS

This application is a U.S. National Stage Application of International Application No. PCT/US2013/031555 filed Mar. 14, 2013, which designates the United States and is incorporated herein by reference in its entirety.

TECHNICAL FIELD OF THE INVENTION

Embodiments of the present invention relates generally to computer security and malware protection and, more particularly, to decryption of data between a client and a server.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic programs or executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

BRIEF DESCRIPTION OF THE DRAWINGS

For a more complete understanding of embodiments of the present invention and its features and advantages, reference is now made to the following description, taken in conjunction with the accompanying drawings, in which.

DETAILED DESCRIPTION

Figure 1:
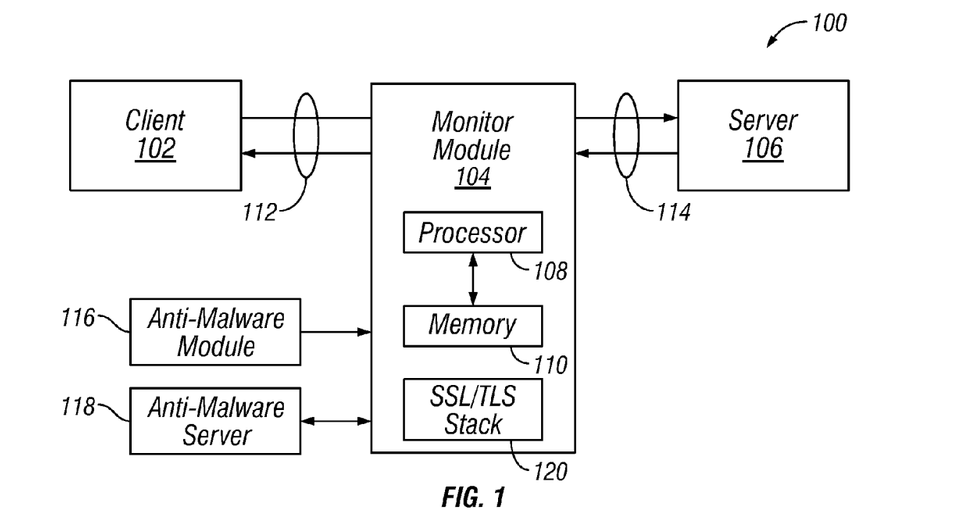
FIG. 1 is an illustration of an example embodiment of a system for decryption of data between a client and a server.

FIG. 1 is an illustration an illustration of an example embodiment of a system 100 for decryption of data between a client and a server. In one embodiment, such decryption may be performed upon communications utilizing public-key cryptography. In another embodiment, such decryption may be performed upon communications utilizing RSA encryption. In yet another embodiment, such decryption may be performed for secured socket layer (SSL) connections between a client and a server. In still yet another embodiment, such decryption may be performed for transport layer security (TLS) connections between a client and a server. In another embodiment such decryption may be performed using asymmetric cryptography, wherein one key is known and one key is private, to exchange a symmetrical key, which may be used subsequently for both encryption and decryption by the client and server. Decryption may be performed on behalf of, for example, the client or the server, such that anti-malware efforts may be performed upon the data being transmitted.

System 100 may include a client 102 communicatively coupled to a server 106 over a network connection to exchange data. Client 102 may be implemented by any suitable electronic device, such as a mobile device, router, computer, server, laptop, desktop, board, or blade. Server 106 may be implemented by any suitable electronic device, such as a mobile device, router, computer, server, laptop, desktop, board, or blade. Furthermore, although a single client and server are shown, system 100 may include any suitable number, kind, and combination of clients and servers. Client 102 and server 106 may be communicatively coupled over any suitable network connection such as the Internet, an intranet, a wide-area-network, a local-area-network, or a wireless network, using any suitable network protocol.

System 100 may include a monitor module 104 configured to monitor traffic between client 102 and server 106. In one embodiment, monitor module 104 may be configured to monitor traffic between client 102 and server 106 to detect malware or malware-related operations. For example, malware may be actually contained within the payloads of data sent between client 102 and server 106. In another example, the data sent between client 102 and server 106 may direct the recipient to access malicious content, such as a malware-infected website.

To make a malware determination, monitor module 104 may take any suitable action. For example, monitor module 104 may be communicatively coupled to or include an anti-malware module 116 or an anti-malware server 118. Monitor module 104 may send information, such as the intercepted data itself; an identifier, such as a hash calculation, signature, or host names; or heuristic or behavioral data to anti-malware module 116 and anti-malware server 118. Anti-malware module 116 and anti-malware server 118 may analyze the information and provide a determination of whether the submitted information indicates malware. Monitor module 104 may be configured to use such a determination to, for example, allow communication to continue or take corrective action. Such corrective action may include reporting the malware to a user or system or blocking the attempted communication. Furthermore, monitor module 104 may be configured as an intrusion prevention device, wherein Anti-malware module 116 may be implemented include, for example, by an anti-malware program, application, engine, function, library, shared library, script, or other suitable entity. Anti-malware server 118 may be implemented by, for example, an anti-malware program, application, engine, function, library, shared library, script, or other suitable entity operating on a networked electronic device. Anti-malware server 118 may be configured to mine, collect, or otherwise analyze data from a plurality of endpoints. Each of anti-malware server 118 and anti-malware module 116 may include, for example, anti-malware rules, behavioral rules, engines, blacklists, whitelists, reputation servers, or signature databases. Such information sources may be used to determine, given—for example, an observation, detected value, or other information potentially indicative of malware—whether the information is indicative of malware.

Although anti-malware module 116 and anti-malware server 118 are shown separately from monitor module 104, anti-malware module 116 and anti-malware server 118 may reside on any suitable electronic device, such as that upon which anti-malware module 116 resides.

In order to monitor traffic between client 102 and server 106, monitor module 104 may be configured to decrypt data sent and received between client 102 and server 106. In one embodiment, the data sent between client 102 and server 106 may be encrypted sing SSL. In another embodiment, the data sent between client 102 and server 106 may be encrypted using TLS.

In one embodiment, monitor module 104 may be communicatively coupled to client 102 through connection 112. In another embodiment, monitor module 104 may be communicatively coupled to server 106 through connection 114. Connections 112, 114 may include bus connections, wireless connections, or network connections through, for example, the Internet, an intranet, a wide-area-network, a local-area-network, or a wireless network. Monitor module 104 may be configured to unpack, read, organize, and repack data according to specifications provided in a network stack such as SSL/TLS stack 120. SSL/TLS stack 120 may include code, functions, or instructions configured to provide off-the-shelf functionality for processing data in a network connection.

Monitor module 104 may be configured to execute on an electronic device. Monitor module 104 may be implemented on any suitable electronic device, such as a mobile device, router, computer, server, laptop, desktop, board, or blade.

In one embodiment, monitor module 104 may be implemented on the same device as client 102. In another embodiment, monitor module 104 may be implemented on an electronic device within a protected cloud, subnet, network, area, group, or other association with client 102. For example, monitor module 104 may be implemented on a security server configured to protect a network of client 102 and its peer electronic devices. In such embodiments, monitor module 104 may be configured to coordinate with client 102 and to protect client 102 from malware.

In one embodiment, monitor module 104 may be implemented on the same device as server 106. In another embodiment monitor module 104, monitor module 104 may be implemented on an electronic device within a protected cloud, subnet, network, area, group, or other association with server 106. For example, monitor module 104 may be implemented on a security server configured to protect a network of server 106 and its peer electronic devices. In such embodiments, monitor module 104 may be configured to coordinate with server 106 and to protect server 106 from malware.

Regardless of where monitor module 104 is implemented, monitor module 104 may include or be communicatively coupled to a memory 110 coupled to a processor 108. Processor 108 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 110. Memory 110 may be configured in part or whole as application memory, system memory, or both. Memory 110 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such monitor module 104, may reside in memory 110 for execution by processor 108.

Processor 108 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processor 108 may also include register renaming logic and scheduling logic, which generally allocate resources and queue the operation corresponding to the convert instruction for execution. After completion of execution of the operations specified by the code instructions, back end logic within processor 108 may retire the instruction. In one embodiment, processor 108 may allow out of order execution but requires in order retirement of instructions. Retirement logic within processor 108 may take a variety of forms as known to those of skill in the art (e.g., re-order buffers or the like). The processor cores of processor 108 are thus transformed during execution of the code, at least in terms of the output generated by the decoder, the hardware registers and tables utilized by the register renaming logic, and any registers modified by the execution logic.

Furthermore, monitor module 104 may include or be communicatively coupled to network interfaces through which monitor module 104 is communicatively coupled to server 106 and to client 102. Such network interfaces may be implemented in any suitable hardware, software, or other mechanism for sending and receiving network traffic over a network connection. Monitor module 104 may include or be communicatively coupled to a client-side network interface, through which network traffic is sent to and received from client 102. Monitor module 104 may include or be communicatively coupled to a server-side network interface, through which network traffic is sent to and received from server 106.

Anti-malware module 116 may be implemented on any suitable electronic device, such as a network appliance, mobile device, router, computer, server, laptop, desktop, board, firewall or blade. Anti-malware module 116 may be implemented by, for example, a program, application, proxy, engine, function, library, shared library, script, device, network appliance, electronic device, digital or analog circuitry, logic, instructions, or any suitable combination thereof.

Some methods of performing monitoring of secured communication between client 102 and server 106 include establishing a first secured communication between client 102 and monitor module 104, and a second secured communication between monitor module 104 and server 106. In one embodiment, system 100 may include a single secured communication connection between client 102 and server 106. Such a single secured communication connection may include an end-to-end Transport Control Protocol connection. Communication received from client 102 or server 106 may be received at monitor module 104 and forwarded on to the recipient without switching the communication to a different data stream. Monitor module 104 may be configured to decrypt the received data asynchronously as data continues to flow between client 102 and server 106. Consequently, client 102 or server 106 may be unaware that monitor module 104 is intercepting and decrypting data.

In operation, monitor module 104 may intercept data transmissions between client 102 and server 106. As information is received at monitor module 104, monitor module 104 may copy or forward the information to server 106. Monitor module 104 may decrypt such data. Furthermore, monitor module 104 may determine whether the data is indicative of malware. Monitor module 104 may make such a determination by, for example, accessing anti-malware module 116 or anti-malware server 118. Monitor module 104 may allow data transmissions to continue that are not indicative of malware. Furthermore, monitor module 104 may cancel, stop, clean, interrupt, redirect, record, or otherwise take corrective action on data streams which include data that is indicative of malware.

FIGS. 2A, 2B, 2C, and 2D are illustrations of example configuration and operation of system 100 for decryption of data between a client and a server. FIGS. 2A, 2B, 2C, and 2D illustrate configuration and operation of system 100 wherein server 106 and monitor module 104 coordinate operation to establish a single communication connection by which client 102 and server 106 may exchange data. Once a communication link is established between server 106 and client 102, monitor module 104 may decrypt communications to be received by server 106. The decryption may include use of public and private keys associated with public key encryption. The public and private key may be linked mathematically. The keys may include cryptographic keys. The keys may be implemented in any suitable manner, such as by a parameter of a cryptography function or algorithm. A public key may be used to encrypt data, which may be decrypted by a matching private key. Public dispersal of a public key may allow parties to encrypt data, while reserving the private key may allow only the owner of the private key to decrypt the data encrypted by the public key. Any entity with the private key might be able to decrypt the data, and thus providing the private key to third parties may destroy the security of the key technology. Thus, the public key and private keys may form an asymmetrical key pair, wherein different keys are used to encrypt versus decrypt data between senders and recipients.

Figure 2A:
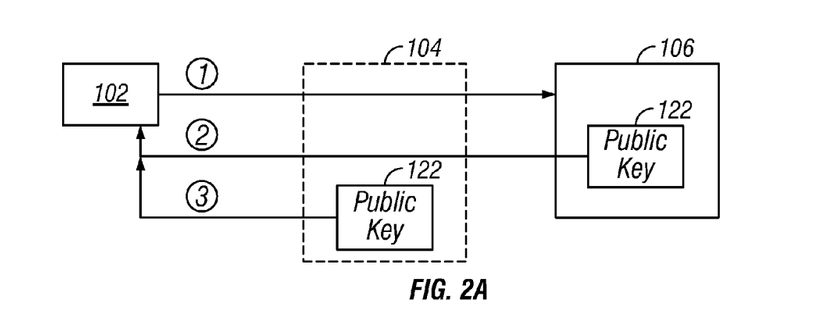
FIGS. 2A, 2B, 2C, and 2D are illustrations of example configuration and operation of a system for decryption of data between a client and a server.

In FIG. 2A, client 102 may initiate communication with server 106. At (1), client 102 may send a request for a public key 122. Public key 122 may be maintained by server 106. Server 106 may return a copy of public key 122 at (2) in reply. In one embodiment, a copy of public key 122 may be kept on monitor module 104 and returned to client 102. Server 106 may send public key 122 directly to monitor module 104.

Figure 2B:
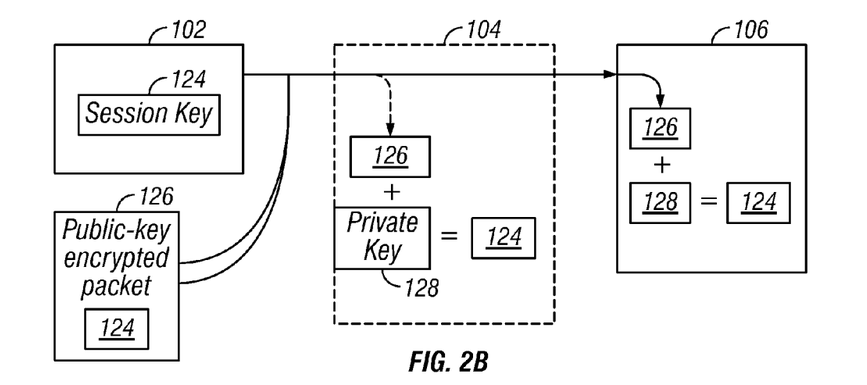

In FIG. 2B, client 102 may generate a session key 124. Session key 124 may be implemented by any suitable cryptographic key. Session key 124 may be private to parties that will be using secured communication between client 102 and server 106. Session key 124 may be a symmetrical key, in that both sender and receiver may use session key 124 to both encrypt and decrypt data. In one embodiment, session key 124 may be generated to be unique to client 102. In another embodiment, session key 124 may be generated to be unique to the particular session of communication between client 102 and server 106. The information for session key 124 may itself be encrypted using public key 122. The resulting encrypted data may be implemented in, for example, public-key-encrypted packet 126. Client 102 may send public-key-encrypted packet 126 to server 106. Monitor module 104 may intercept or copy public-key-encrypted packet 126 for itself, and forward the original or a copy to server 106. Given public key 122 associated with server 106, a private key 128 may exist which may decrypt information encrypted with public key 122. Private key 128 may be designated and controlled by server 106. Server 106 may coordinate, transmit, synchronize, or otherwise provide a copy of private key 128 to monitor module 104. Such a transmission may itself be encrypted. Server 106 and monitor module 104 may each use private key 128 to decrypt public-key-encrypted packet 126, yielding session key 124. Consequently, client 102, monitor module 104, and server 106 may each possess a copy of session key 124.

Figure 2C:
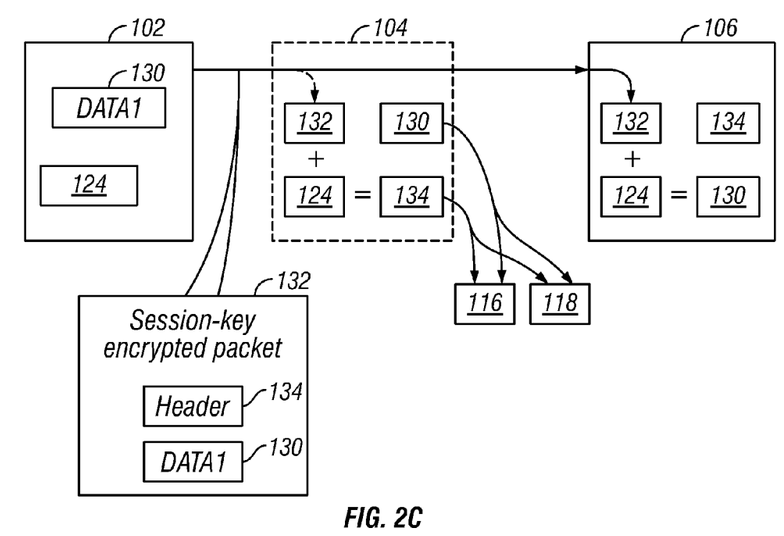

In FIG. 2C, client 102 may encrypt a structure with information such as header 134 and data1 130. Such information may be intended to be delivered to server 106. Client 102 may encrypt the data packet using session key 124. The resulting structure may include, for example, session-key-encrypted packet 132. Session-key-encrypted packet 132 may be sent to server 106. Monitor module 104 may intercept or copy session-key-encrypted packet 132 for itself, and forward the original or a copy to server 106. Server 106 and monitor module 104 may each use session key 124 to decrypt session-key-encrypted packet 132, yielding header 134 and data1 130. Monitor module 104 may use header 134 and data1 130, along with subsequently or previously intercepted and decrypted information, to determine whether the data transmission is indicative of malware. Such a determination may be made, for example, by referencing anti-malware module 116 or anti-malware server 118 with header 134 and data1 130.

Figure 2D:
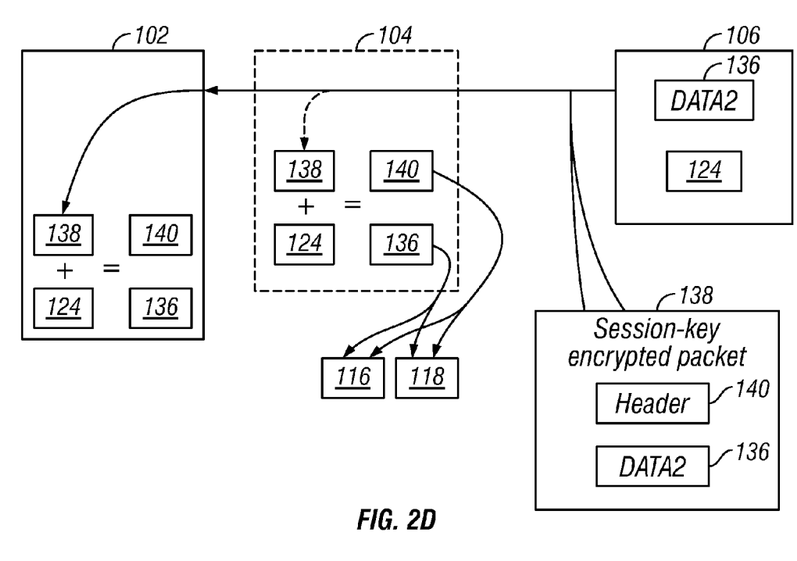

In FIG. 2D, server 106 may encrypt a structure with information such as header 140 and data 136. Such information may be intended to be delivered to client 102. Server 106 may encrypt the data packet using session key 124. The resulting structure may include, for example, session-key-encrypted packet 138. Session-key-encrypted packet 138 may be sent to client 102. Monitor module 104 may intercept or copy session-key-encrypted packet 138 for itself, and forward the original or a copy to client 102. Client 102 and monitor module 104 may each use session key 124 to decrypt session-key-encrypted packet 138, yielding header 140 and data 136. Monitor module 104 may use header 140 and data 136, along with subsequently or previously intercepted and decrypted information, to determine whether the data transmission is indicative of malware. Such a determination may be made, for example, by referencing anti-malware module 116 or anti-malware server 118 with header 140 and data1 136.

The operations shown in FIGS. 2C and 2D may repeat until a data transmission link is terminated, or, for example, until corrective action is taken by monitor module 104.

FIGS. 3A, 3B, 3C, and 3d are illustrations of another example configuration and operation of system 100 for decryption of data between a client and a server. FIGS. 3A, 3B, 3C, and 3d illustrate configuration and operation of system 100 wherein client 102 and monitor module 104 coordinate operation to establish a single communication connection by which client 102 and server 106 may exchange data. Once a communication link is established between server 106 and client 102, monitor module 104 may decrypt communications to be received by server 106. The decryption may include use of public and private keys associated with public key encryption.

Figure 3A:
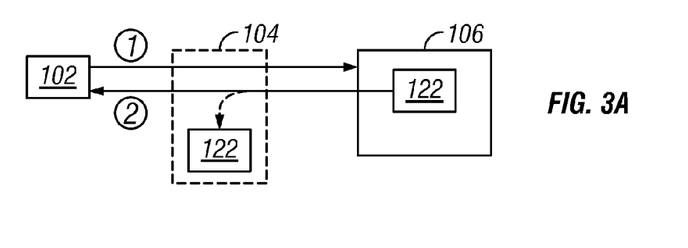
FIGS. 3A, 3B, 3C, and 3D are illustrations of another example configuration and operation of a system for decryption of data between a client and a server.

In FIG. 3A, client 102 may initiate communication with server 106. At (1), client 102 may send a request for a public key 122. Monitor module 104 may recognize the request and anticipate a return of public key 122. Public key 122 may be maintained by server 106. Server 106 may return a copy of public key 122 at (2) in reply. In one embodiment, monitor module 104 may intercept and copy public key 122, while forwarding the original or a copy to client 102. In another embodiment, client 102 may directly contact monitor module 104 to provide a copy of public key 122 after receiving public key 122 from server 106.

Figure 3B:
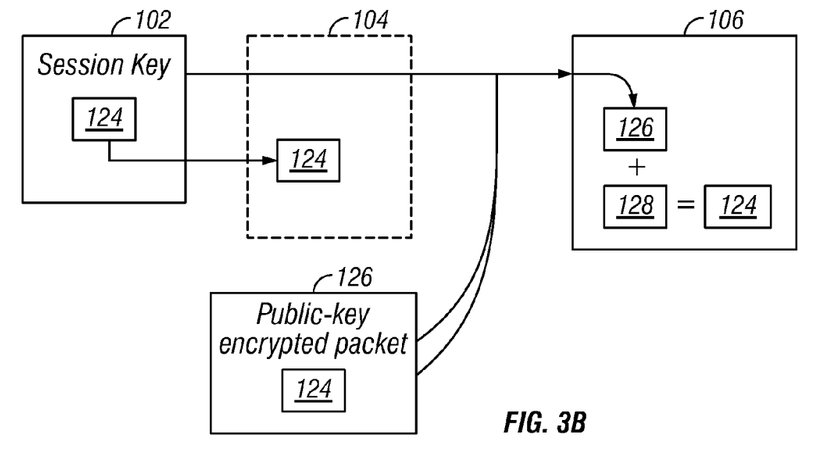

In FIG. 3B, client 102 may generate a session key 124. Session key 124 may be implemented by any suitable cryptographic key. Session key 124 may be private to parties that will be using secured communication between client 102 and server 106. In one embodiment, session key 124 may be generated to be unique to client 102. In another embodiment, session key 124 may be generated to be unique to the particular session of communication between client 102 and server 106. The information for session key 124 may itself be encrypted using public key 122. The resulting encrypted data may be implemented in, for example, public-key-encrypted packet 126. Client 102 may send public-key-encrypted packet 126 to server 106. Because monitor module 104 has no copy of a corresponding private key, monitor module 104 may be unable to decrypt public-key-encrypted packet 126. Client 102 may send session key 124 directly to monitor module 104. Such a transmission itself may be encrypted. Given public key 122 associated with server 106, a private key 128 may exist which may decrypt information encrypted with public key 122. Private key 128 may be designated and controlled by server 106. Server 106 may use private key 128 to decrypt public-key-encrypted packet 126, yielding session key 124. Consequently, client 102, monitor module 104, and server 106 may each possess a copy of session key 124.

Figure 3C:
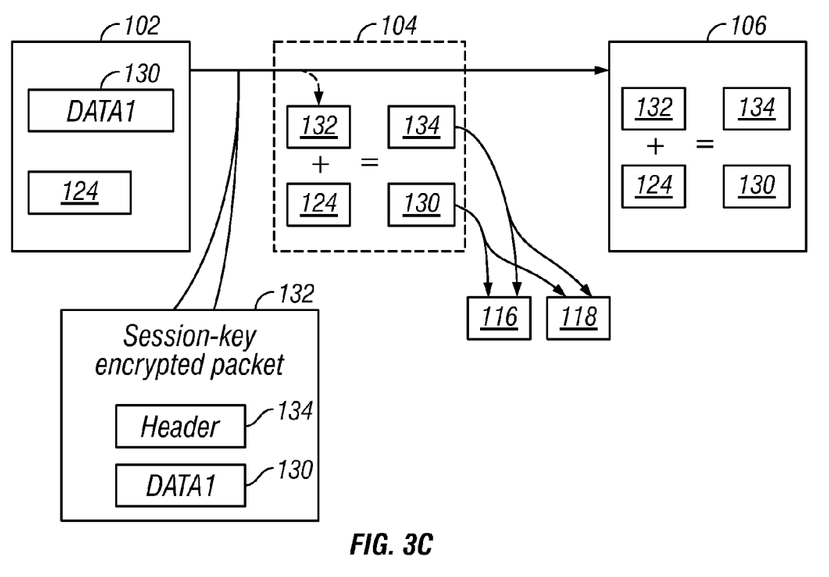

In FIG. 3C, client 102 may encrypt a structure with information such as header 134 and data1 130. Such information may be intended to be delivered to server 106. Client 102 may encrypt the data packet using session key 124. The resulting structure may include, for example, session-key-encrypted packet 132. Session-key-encrypted packet 132 may be sent to server 106. Monitor module 104 may intercept or copy session-key-encrypted packet 132 for itself, and forward the original or a copy to server 106. Server 106 and monitor module 104 may each use session key 124 to decrypt session-key-encrypted packet 132, yielding header 134 and data1 130. Monitor module 104 may use header 134 and data1 130, along with subsequently or previously intercepted and decrypted information, to determine whether the data transmission is indicative of malware. Such a determination may be made, for example, by referencing anti-malware module 116 or anti-malware server 118 with header 134 and data1 130.

Figure 3D:
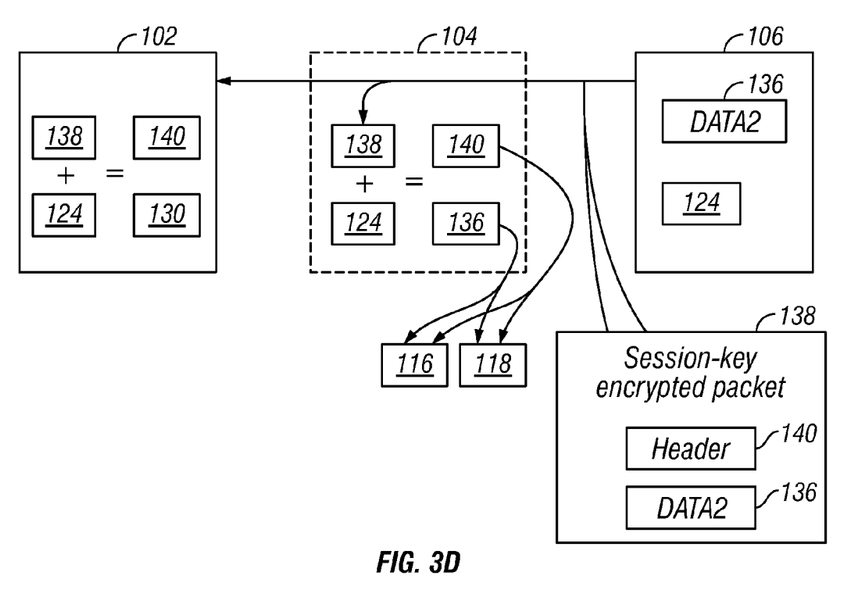

In FIG. 3D, server 106 may encrypt a structure with information such as header 140 and data 136. Such information may be intended to be delivered to client 102. Server 106 may encrypt the data packet using session key 124. The resulting structure may include, for example, session-key-encrypted packet 138. Session-key-encrypted packet 138 may be sent to client 102. Monitor module 104 may intercept or copy session-key-encrypted packet 138 for itself, and forward the original or a copy to client 102. Client 102 and monitor module 104 may each use session key 124 to decrypt session-key-encrypted packet 138, yielding header 140 and data 136. Monitor module 104 may use header 140 and data 136, along with subsequently or previously intercepted and decrypted information, to determine whether the data transmission is indicative of malware. Such a determination may be made, for example, by referencing anti-malware module 116 or anti-malware server 118 with header 140 and data1 136.

The operations shown in FIGS. 3C and 3D may repeat until a data transmission link is terminated, or, for example, until corrective action is taken by monitor module 104.

Consequently, when monitoring encrypted transmissions between client 102 and server 106, monitor module 104 need not decrypt traffic with one key and then reencrypt the traffic using a different key to communicate with the server. A single encrypted transmission connection is maintained between client 102 and server 106. Such a transmission connection may include, for example, a single TCP connection. In solutions requiring two separate connections, such as between a client and a proxy, and between the proxy and a server, two sets of public-private keys may be required. Each such connection may be a separate, encrypted session. The information received at the proxy from the client may not be decipherable by the server. Likewise, the information received at the proxy from the server may not be decipherable by the client. Furthermore, when monitoring encrypted transmissions between client 102 and server 106, monitor module 104 may not need to repackage or reencrypt decrypted information to send to the recipient. Instead, the original, received information may be forwarded to the recipient. The encryption format of the data as it is sent by a client or server may be identical to the encryption format of the data as it is received by a recipient. In addition, monitor module 104 need not implement an entire protocol stack, for example, for SSL or TLS protocols. Specifically, SSL/TLS stack 120 may not require contents, modules, or functions for SSL handshake protocols or SSL alert protocols.

Figure 4:
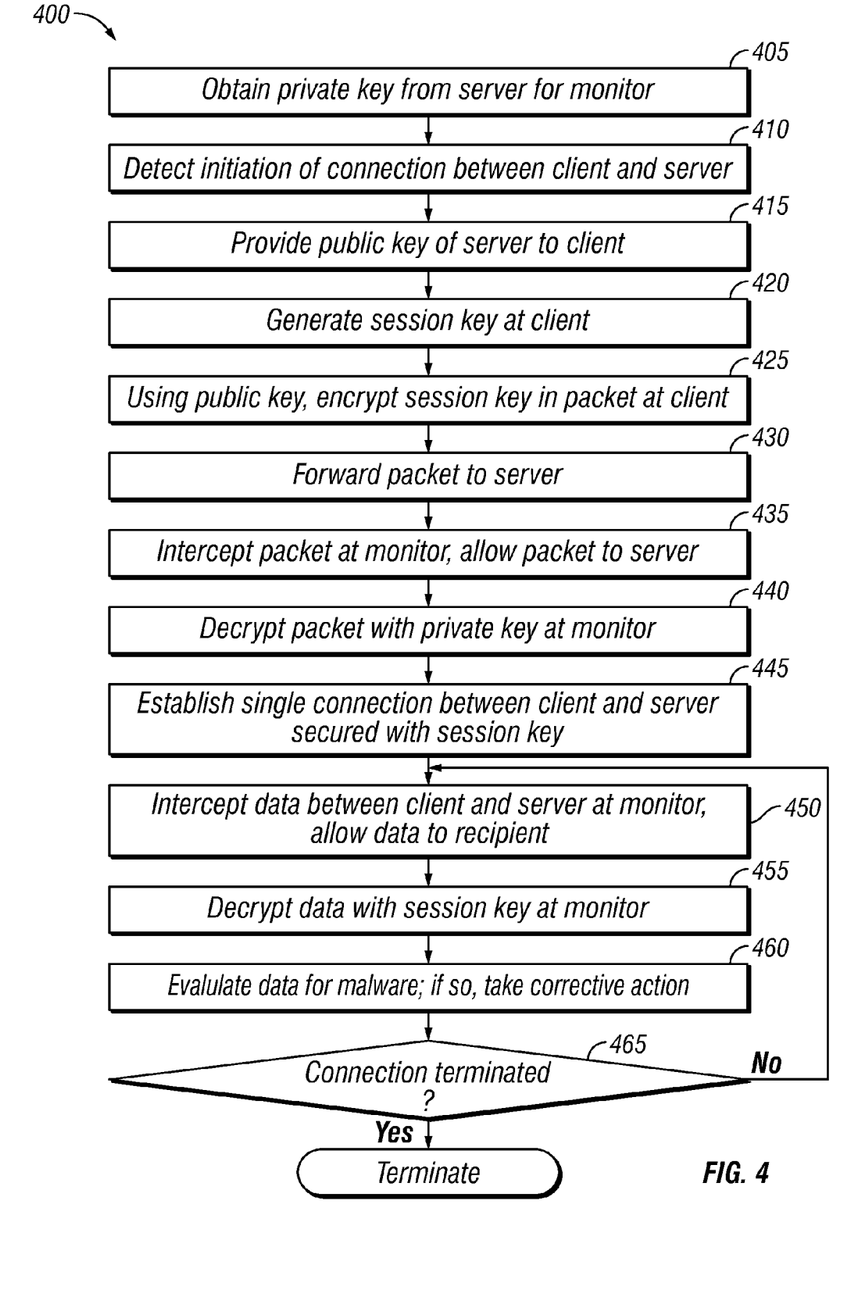
FIG. 4 is an illustration of an example embodiment of a method for decryption of data between a client and a server.

FIG. 4 is an illustration of an example embodiment of a method 400 for decryption of data between a client and a server. Method 400 may be initiated by any suitable criteria. Furthermore, although method 400 describes a client and a server, method 400 may be performed by any network node recipient, network node sender, and monitor. Method 400 may be implemented using the system of FIGS. 1-3 or any other system operable to implement method 400. As such, the preferred initialization point for method 400 and the order of the elements comprising method 400 may depend on the implementation chosen. In some embodiments, some elements may be optionally omitted, repeated, or combined. In certain embodiments, method 400 may be implemented partially or fully in software embodied in computer-readable media.

At 405, a private key for a server may be obtained. The private key may be obtained for use by a monitor configured to conduct one or more steps of 400 for decrypting data between a client and a server. The private key may be obtained before the operation of method 400. The private key may be transmitted from the server to the monitor in any suitable manner, such as over a secured connection or through a bus interface.

At 410, initiation of a connection between a client and a server may be detected. A public key may be provided to the client at 415. The public key may be associated with the server. The public key may be the cryptographic pair of the private key discussed at 405.

At 420, a session key may be generated at the client. The session key may be unique to the client. Furthermore, the session key may be unique to the attempted connection between the client and the server.

At 425, the session key may be encrypted into a data transmission packet at the client. The session key may be encrypted using the public key described above, wherein the public key is associated with the server.

At 430, the packet may be forwarded to the server. At 435, the packet may be intercepted at the monitor. The packet may be forwarded, copied, or otherwise allowed to also be sent to the server. The packet as sent to the server may be unaltered. At 440, the packet may be decrypted at the monitor with the private key. The result may include determination of the session key encrypted therein.

At 445, a connection may be established between the server and the client. Such a connection may be made by additional handshaking and protocol requirements. The connection may include a single, logical network connection between the server and the client, such as a TCP connection. Furthermore, the connection may be secured using, for example, SSL or TLS. The connection may be secured with the session key.

At 450, data being transmitted between the client and the server may be intercepted at the monitor. The data may otherwise be allowed to proceed to its recipient, without first decrypting and re-encrypting the data contents. At 455, the data may be decrypted for the monitor. The decryption may be performed with the session key. At 460, the data may be evaluated to determine whether it is indicative of malware. If the data is indicative of malware, any suitable corrective action may be taken, such as termination of the malware-related connection, cleaning the malware, or reporting the malware attack.

At 465, it may be determined whether the connection has terminated. Termination may have been performed in 460. Furthermore, termination may have happened as an independent action by the client or the server. If the connection has not terminated, method 400 may proceed to 450. If the connection has terminated, method 400 may terminate.

Figure 5:
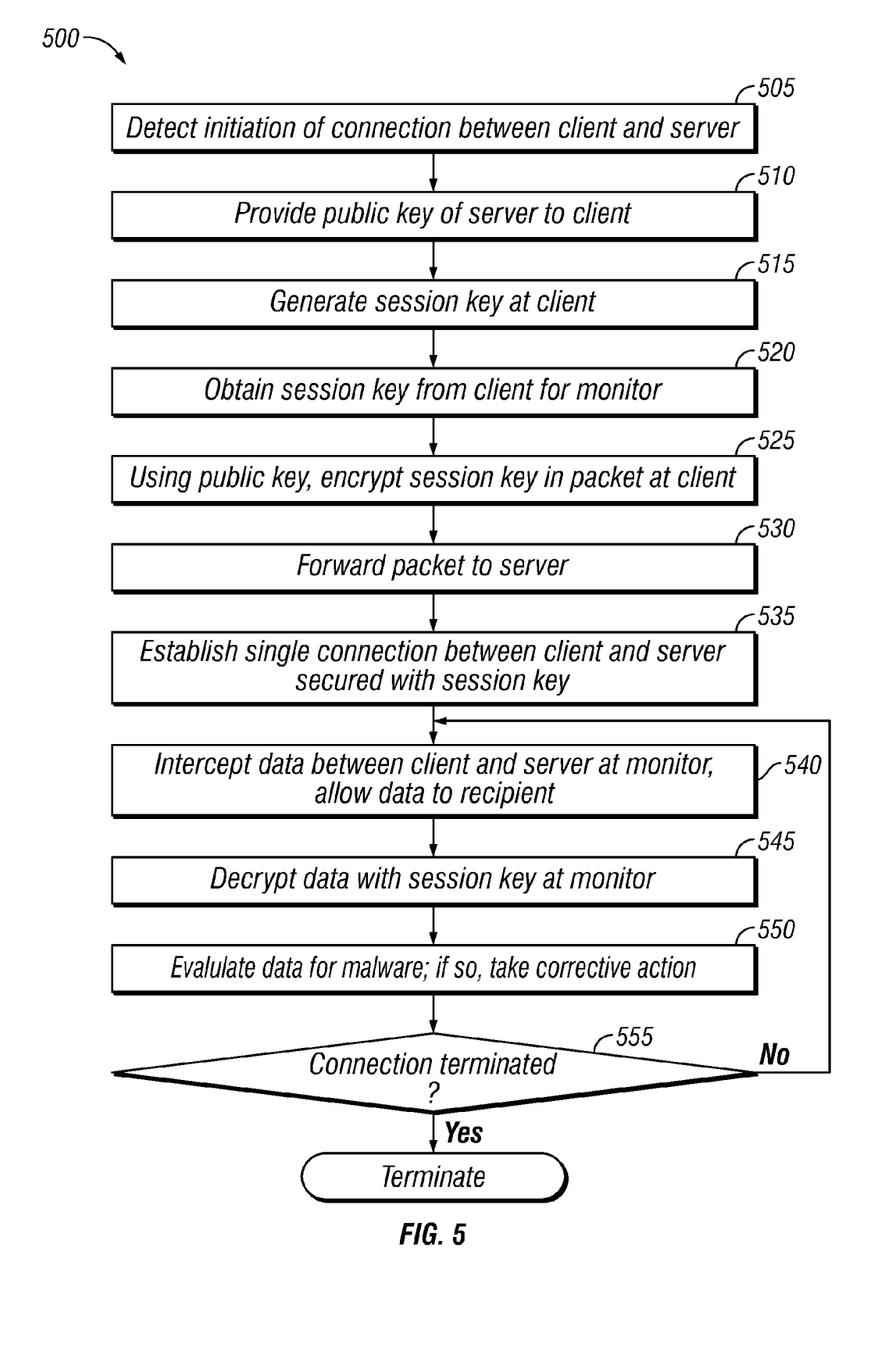
FIG. 5 is an illustration of another example embodiment of a method for decryption of data between a client and a server.

FIG. 5 is an illustration of another example embodiment of a method 500 for decryption of data between a client and a server. Method 500 may be initiated by any suitable criteria. Furthermore, although method 500 describes a client and a server, method 400 may be performed by any network node recipient, network node sender, and monitor. Method 500 may be implemented using the system of FIGS. 1-3 or any other system operable to implement method 500. As such, the preferred initialization point for method 500 and the order of the elements comprising method 500 may depend on the implementation chosen. In some embodiments, some elements may be optionally omitted, repeated, or combined. In certain embodiments, method 500 may be implemented partially or fully in software embodied in computer-readable media.

At 505, initiation of a connection between a client and a server may be detected. A public key may be provided to the client at 510. The public key may be associated with the server.

At 515, a session key may be generated at the client. The session key may be unique to the client. Furthermore, the session key may be unique to the attempted connection between the client and the server.

At 520, the session key may be obtained for a monitor. The session key may be obtained for use by a monitor configured to conduct one or more steps of 500 for decrypting data between a client and a server. The session key may be obtained at any suitable time. For example, if the session key is unique to the client and is persistent, the session key may be provided to the monitor before the operation of method 500. In another example, the session key may be provided to the monitor upon its generation. The private key may be transmitted from the client to the monitor in any suitable manner, such as over a secured connection or through a bus interface.

At 525, the session key may be encrypted into a data transmission packet at the client. The session key may be encrypted using the public key described above, wherein the public key is associated with the server.

At 530, the packet may be forwarded to the server. At 535, a connection may be established between the server and the client. Such a connection may be made by additional handshaking and protocol requirements. In addition, such a connection may be made by the server decrypting the packet with a private key to obtain the session key. The public key may be the cryptographic pair of the private key. The session may be secured using the session key. The connection may include a single, logical network connection between the server and the client, such as a TCP connection. Furthermore, the connection may be secured using, for example, SSL or TLS.

At 540, data being transmitted between the client and the server may be intercepted at the monitor. The data may otherwise be allowed to proceed to its recipient, without first decrypting and re-encrypting the data contents. At 545, the data may be decrypted for the monitor. The decryption may be performed with the session key. At 550, the data may be evaluated to determine whether it is indicative of malware. If the data is indicative of malware, any suitable corrective action may be taken, such as termination of the malware-related connection, cleaning the malware, or reporting the malware attack.

At 555, it may be determined whether the connection has terminated. The connection may be been terminated in 550. Furthermore, the connection may have been independently terminated by the client or the server. If the connection has not terminated, method 500 may proceed to 540. If the connection has terminated, method 500 may terminate.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing. The following examples pertain to further embodiments. Specifics in the examples may be used anywhere in one or more embodiments described above or herein.

The following examples pertain to further embodiments.

A method for electronic communication may be performed on an electronic device. Any suitable portions or aspects of the method may be implemented in at least one machine readable storage medium or in a system, as described below. The method may include any suitable combination of elements, actions, or features. For example, the method may include monitoring a secured network connection between a client and a server. The secured network connection may be secured using a symmetric cryptographic key. The method may also include detecting a transmission of secured information between the client and the server, copying the transmission, forwarding the transmission to an intended recipient, decrypting the transmission using the symmetric cryptographic key, and determining whether the transmission is indicative of malware. In addition, the method may include receiving the symmetric cryptographic key from the client. Furthermore, the method may include forwarding a setup transmission encrypted using an asymmetric cryptographic key to the server. The setup transmission may include the symmetric cryptographic key. Also, the method may include receiving an asymmetric cryptographic key from the server, receiving a setup transmission from the client, and using the asymmetric cryptographic key to decrypt the setup transmission. Decrypting the setup transmission may be used to obtain the symmetric cryptographic key. The secured network connection may include an end-to-end Transport Control Protocol connection. An encryption format of the transmission as received by the server may be identical to an encryption format of the transmission as sent by the client. The symmetrical cryptographic key may be unique to the secured network connection.

At least one machine readable storage medium may include computer-executable instructions carried on the computer readable medium. Various aspects of the medium may implement any suitable portions or combinations of the method described above or the system described below. The instructions may be readable by a processor. The instructions, when read and executed, may cause the processor to monitor a secured network connection between a client and a server. The secured network connection may be secured using a symmetric cryptographic key. Instructions may also be included for causing the processor to detect a transmission of secured information between the client and the server, copying the transmission, forwarding the transmission to an intended recipient, decrypting the transmission using the symmetric cryptographic key, and determining whether the transmission is indicative of malware. In addition, instructions may also be included for causing the processor to receive the symmetric cryptographic key from the client. Furthermore, the instructions may also cause the processor to forward a setup transmission encrypted using an asymmetric cryptographic key to the server. The setup transmission may include the symmetric cryptographic key. Also, the instructions may cause the processor to receive an asymmetric cryptographic key from the server, receiving a setup transmission from the client, and to use the asymmetric cryptographic key to decrypt the setup transmission. Decrypting the setup transmission may be used to obtain the symmetric cryptographic key. The secured network connection may include an end-to-end Transport Control Protocol connection. An encryption format of the transmission as received by the server may be identical to an encryption format of the transmission as sent by the client. The symmetrical cryptographic key may be unique to the secured network connection.

A system may be configured for electronic communication. The system may implement any suitable portions or combinations of the method or the at least one machine readable storage medium as described above. The system may include a client-side network interface, a server-side network interface, and a monitor module. The monitor module may be communicatively coupled to the client-side network interface and to the server-side network interface. The monitor module may be configured to monitor a secured network connection between the client-side network interface and the server-side network interface. The secured network connection may be secured using a symmetric cryptographic key. The monitor module may be further configured to detect a transmission of secured information between the client-side interface and the server-side interface, copy the transmission, forward the transmission to an intended recipient, decrypt the transmission using the symmetric cryptographic key, and determine whether the transmission is indicative of malware. In addition, the monitor module may be further configured to receive the symmetric cryptographic key through the client-side network interface. Furthermore, the monitor module may also be configured to forward a setup transmission encrypted using an asymmetric cryptographic key through the server-side network interface. The setup transmission may include the symmetric cryptographic key. Also, the monitor module may be further configured to receive an asymmetric cryptographic key through the server-side network interface, receive a setup transmission through the client-side network interface, and use the asymmetric cryptographic key to decrypt the setup transmission. Decrypting the setup transmission may be performed to obtain the symmetric cryptographic key. The secured network connection may include an end-to-end Transport Control Protocol connection. An encryption format of the transmission as sent through the server-side network interface may be identical to an encryption format of the transmission as received through the client-side network interface. The symmetrical cryptographic key may be unique to the secured network connection. The monitor module may reside on the server.

A system for electronic communication may be performed on an electronic device. The system may include any suitable combination of elements, actions, or features. For example, the system may include means for monitoring a secured network connection. The secured network connect may be between a client-side network interface and a server-side network interface. The secured network connection may be secured using a symmetric cryptographic key. The system may also include means for detecting a transmission of secured information between the client-side network interface and the server-side network interface, copying the transmission, forwarding the transmission to an intended recipient, decrypting the transmission using the symmetric cryptographic key, and determining whether the transmission is indicative of malware. In addition, the system may include means for receiving the symmetric cryptographic key through the client-side network interface. Furthermore, the system may include forwarding a setup transmission encrypted using an asymmetric cryptographic key through the server-side network interface. The setup transmission may include the symmetric cryptographic key. Also, the system may include means for receiving an asymmetric cryptographic key through the sever-side network interface, receiving a setup transmission through the client-side network interface, and using the asymmetric cryptographic key to decrypt the setup transmission. Decrypting the setup transmission may be used to obtain the symmetric cryptographic key. The secured network connection may include an end-to-end Transport Control Protocol connection. An encryption format of the transmission as sent through the server-side network interface may be identical to an encryption format of the transmission as received through the client-side network interface. The symmetrical cryptographic key may be unique to the secured network connection.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. A system for securing communication, comprising:
a hardware processor;
a client-side network interface to communicatively couple the hardware processor to a client; and
a server-side network interface to communicatively couple the hardware processor to a server;
wherein the hardware processor is configured to:
receive one of a public key and a private key of an asymmetric cryptographic key pair generated by the server;
intercept a server setup transmission from the client to the server, wherein the server setup transmission is encrypted using another of the public key and the private key of the asymmetric cryptography key pair, and wherein the server setup transmission includes a session key for subsequent communication between the client and the server, the session key comprising a symmetric cryptography key generated by the client;
use the received one of the public key and the private key of the asymmetric cryptographic key pair to decrypt the server setup transmission to obtain the session key; and
subsequent to obtaining the session key:
monitor a secured network connection between the client and the server through the client-side network interface and the server-side network interface, wherein the secured network connection is secured using the session key;
intercept a transmission of secured information between the client and the server over the secured network connection;
copy the transmission of the secured information;
forward the transmission of the secured information to an intended recipient at the client or the server;
decrypt the transmission of the secured information using the session key; and
determine whether the transmission of the secured information is indicative of malware.

2. The system of claim 1, wherein the hardware processor is further configured to receive the session key from the client through the client-side network interface.

3. The system of claim 1, wherein the hardware processor is further configured to forward the server setup transmission to the server through the server-side network interface.

4. The system of claim 1, wherein the secured network connection includes an end-to-end Transport Control Protocol connection.

5. The system of claim 1, wherein:
the transmission of the secured information is from the server to the client; and
an encryption format of the transmission of the secured information as received by the hardware processor through the server-side network interface is identical to an encryption format of the transmission of the secured information as forwarded by the hardware processor to the client through the client-side network interface.

6. The system of claim 1, wherein the session key is unique to the secured network connection.

7. The system of claim 1, wherein the hardware processor resides on a server.

8. A method for securing communication between a client and a server, comprising:
receiving one of a public key and a private key of an asymmetric cryptographic key pair generated by the server;
intercepting a server setup transmission from the client to the server, wherein the server setup transmission is encrypted using another of the public key and the private key of the asymmetric cryptography key pair, and wherein the server setup transmission includes a session key for subsequent communication between the client and the server, the session key comprising a symmetric cryptography key generated by the client;
using the received one of the public key and the private key of the asymmetric cryptographic key pair to decrypt the server setup transmission to obtain the session key; and
subsequent to obtaining the session key:
monitoring a secured network connection between the client and the server, wherein the secured network connection is secured using the session key;
intercepting a transmission of secured information between the client and the server over the secured network connection;
copying the transmission of the secured information;
forwarding the transmission of the secured information to an intended recipient at the client or the server;
decrypting the transmission of the secured information using the session key; and
determining whether the transmission of the secured information is indicative of malware.

9. The method of claim 8, further comprising receiving the session key from the client.

10. The method of claim 8, further comprising forwarding the server setup transmission to the server.

11. The method of claim 8, wherein the secured network connection includes an end-to-end Transport Control Protocol connection.

12. The method of claim 8, wherein:
the transmission of the secured information is from the client to the server; and
an encryption format of the transmission of the secured information as received by the server is identical to an encryption format of the transmission as sent by the client.

13. The method of claim 8, wherein the session key is unique to the secured network connection.

14. At least one non-transitory machine-readable storage medium, comprising computer-executable instructions carried on the computer readable medium, the instructions readable by a processor, the instructions, when read and executed, for causing the processor to:
receive one of a public key and a private key of an asymmetric cryptographic key pair generated by a server;
intercept a server setup transmission from a client to the server, wherein the server setup transmission is encrypted using another of the public key and the private key of the asymmetric cryptography key pair, and wherein the server setup transmission includes a session key for subsequent communication between the client and the server, the session key comprising a symmetric cryptography key generated by the client;
use the received one of the public key and the private key of the asymmetric cryptographic key pair to decrypt the server setup transmission to obtain the session key; and
subsequent to obtaining the session key:
monitor a secured network connection between the client and the server, wherein the secured network connection is secured using the session key;

intercept a transmission of secured information between the client and the server over the secured network connection;

copy the transmission of the secured information;

forward the transmission of the secured information to an intended recipient at the client or the server;

decrypt the transmission of the secured information using the session key; and determine whether the transmission of the secured information is indicative of malware.

15. The medium of claim 14, further comprising instructions for causing the processor to receive the session key from the client.

16. The medium of claim 14, further comprising instructions for causing the processor to forward the server setup transmission to the server.

17. The medium of claim 14, wherein the secured network connection includes an end-to-end Transport Control Protocol connection.

18. The medium of claim 14, wherein:

the transmission of the secured information is from the client to the server; and an encryption format of the transmission of the secured information as received by the server is identical to an encryption format of the transmission as sent by the client.

19. The medium of claim 14, wherein the session key is unique to the secured network connection.

\* \* \* \* \*